(12) United States Patent
Vahdat et al.

(10) Patent No.: US 8,965,203 B1
(45) Date of Patent: Feb. 24, 2015

(54) FLEXIBLE NON-MODULAR DATA CENTER WITH RECONFIGURABLE EXTENDED-REACH OPTICAL NETWORK FABRIC

(71) Applicant: Google Inc., Mountain View, CA (US)

(72) Inventors: Amin Vahdat, Los Altos, CA (US); Hong Liu, Palo Alto, CA (US); Ryohei Urata, Sunnyvale, CA (US); Xiaoxue Zhao, Fremont, CA (US); Chris L. Johnson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 124 days.

(21) Appl. No.: 13/631,325

(22) Filed: Sep. 28, 2012

Related U.S. Application Data

(60) Provisional application No. 61/584,684, filed on Jan. 9, 2012.

(51) Int. Cl.
*H04J 14/00* (2006.01)

(52) U.S. Cl.
USPC ............ 398/48; 398/49; 398/45; 398/50; 398/51; 398/56; 398/79; 398/46; 385/24; 385/16; 385/17; 385/18

(58) Field of Classification Search
CPC .............. H04J 14/0212; H04J 14/0204; H04J 14/0217; H04J 14/02; H04J 14/022; H04J 14/0201
USPC ........... 398/45, 48, 49, 50, 51, 54, 56, 57, 79, 398/83, 55, 46, 47, 52, 53, 58, 82; 385/24, 385/16, 17, 18
See application file for complete search history.

(56) References Cited

U.S. PATENT DOCUMENTS

| | | | |
|---|---|---|---|
| 6,782,210 B1 * | 8/2004 | Okada et al. | 398/161 |
| 2006/0171712 A1 * | 8/2006 | Tanaka et al. | 398/45 |
| 2012/0008945 A1 * | 1/2012 | Singla et al. | 398/49 |

* cited by examiner

*Primary Examiner* — Hanh Phan
(74) *Attorney, Agent, or Firm* — Edward A. Gordon; Foley & Lardner LLP

(57) ABSTRACT

The disclosure describes implementations of an apparatus including a plurality of racks, wherein each rack houses a plurality of networking devices and each networking device includes a communication port. An optical circuit switch can be coupled to each of the plurality of communication ports in one or more of the plurality of racks, and a plurality of top-of-rack (TOR) switches can be coupled to the optical circuit switch. Other implementations are disclosed and claimed.

30 Claims, 8 Drawing Sheets

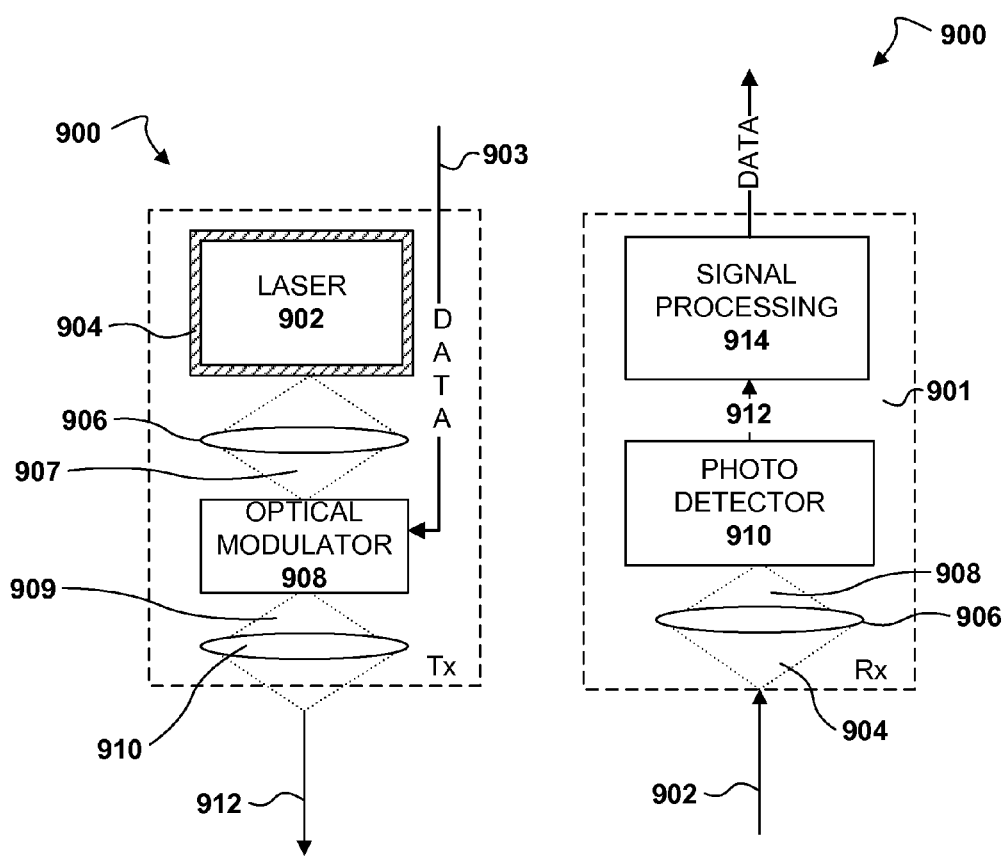

FLEXIBLE NON-MODULAR DATA CENTER WITH RECONFIGURABLE EXTENDED-REACH OPTICAL NETWORK FABRIC

CROSS-REFERENCE TO RELATED APPLICATIONS

This application claims priority under the provisions of 35 U.S.C. §119(e) to U.S. Provisional Application No. 61/584,684, filed 9 Jan. 2012.

TECHNICAL FIELD

The disclosed implementations relate generally to optical communication and in particular, but not exclusively, to flexible, non-modular data centers with reconfigurable extended-reach optical network fabric.

BACKGROUND

Cloud computing and its applications are changing the way people communicate and share information. The underlying computer networks that support cloud computing and other services can consist of an enormous number of individual computers—thousands to tens of thousands of them—housed in large facilities and working in concert. These large facilities are referred to as warehouse-scale computers. As a result of their size, warehouse-scale computers require the interconnection of large numbers of computers and networking devices (e.g., servers, switches and routers). The sheer number and scale of interconnection in warehouse-scale computers creates a need for low-cost interconnects with low power consumption and compact size, while the rate of growth creates a need for flexibility in the capacity and arrangement of data centers.

BRIEF DESCRIPTION OF THE DRAWINGS

Non-limiting and non-exhaustive implementations of the present invention are described with reference to the following figures, wherein like reference numerals refer to like parts throughout the various views unless otherwise specified.

FIG. 8 is a block diagram of an implementation of an optical transmitter.

FIG. 9 is a block diagram of an implementation of an optical receiver.

DETAILED DESCRIPTION OF THE ILLUSTRATED EMBODIMENTS

Embodiments of an apparatus, system and method for flexible, non-modular data centers with reconfigurable extended-reach optical network fabric are described. Numerous specific details are described to provide a thorough understanding of implementations of the invention, but one skilled in the relevant art will recognize that the invention can be practiced without one or more of the specific details, or with other methods, components, materials, etc. In some instances, well-known structures, materials, or operations are not shown or described in detail but are nonetheless encompassed within the scope of the invention.

Reference throughout this specification to "one implementation" or "an implementation" means that a particular feature, structure, or characteristic described in connection with the implementation is included in at least one described implementation. Thus, appearances of the phrases "in one implementation" or "in an implementation" in this specification do not necessarily all refer to the same implementation. Furthermore, the particular features, structures, or characteristics may be combined in any suitable manner in one or more implementations.

Figure 1:
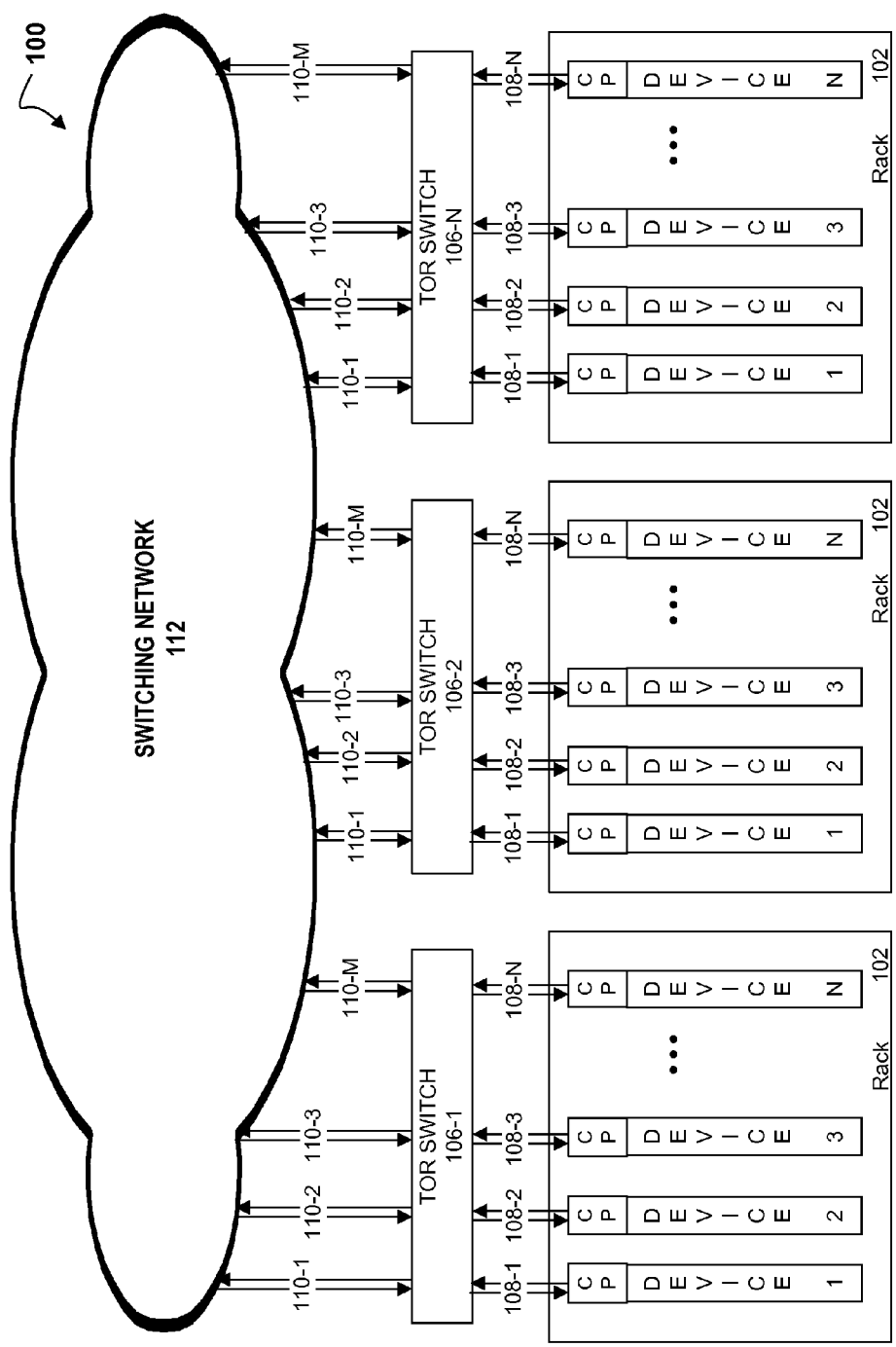
FIG. 1 is a block diagram of an implementation of a data center.

FIG. 1 illustrates an implementation of a data center 100. Data center 100 includes a plurality of racks 102. Within each rack 102 are housed N networking devices, where N can be any number greater than one. Each networking device can be a server, a router, a switch or some other kind of electrical networking equipment, and each networking device is coupled to a corresponding communication port (CP) or multiple CPs. A communication port can be one or more elements, such as electrical or optical transceivers, that are coupled to the networking device and allow the networking device to communicate with other networking devices.

Each networking device in a rack 102 is coupled to a switching network 112 via a top-of-rack (TOR) switch 106 positioned atop the rack. Although referred to in this application as "top-of-rack" switches, each switch 106 need not actually be on top of a rack. Each switch 106 can be located elsewhere, such as below the rack, beside the rack, or completely displaced away from the rack, determined in part by the nature of the connections made to each switch 106. TOR switches 106 are the first point of entry into the data center communication network, responsible for transmitting data between networking devices in the same rack as well as between networking devices in different racks. Each TOR switch 106 is coupled to networking devices within its corresponding rack by N communication links 108 and is coupled to switching network 112 by M communication links 110. The ratio of (1) the communication bandwidth from the networking devices to each TOR switch 106 and (2) the communication bandwidth from each TOR switch 106 to switching network 112 is referred to as the oversubscription ratio. Assuming that each interconnect/link has the same bandwidth, with the number of communication links 108 between the networking devices and TOR switch 106 being N and the number of communication links 110 between TOR switch 106 and switching network 112 being M, the oversubscription ratio is N:M or, expressed as a fraction, N/M.

In one implementation communication links 108 can be electrical links such as copper wire, but in other implementations links 108 can be optical links, for example a pair of unidirectional multimode fiber (MMF) links or a single bidirectional MMF link. In still other implementations, all links 108 need not be of the same type. Similarly, in one implementation communication links 110 can be electrical links such as copper wire, but in other implementations links 110 can be optical links, for example a pair of unidirectional multimode fiber (MMF) links or a single bidirectional MMF link. In still other implementations, all links 110 need not be of the same type. Switching network 112 enables the different devices within different racks 102 to communicate with each other, as well as to communicate with other servers or computers within or outside data center 100.

The large number of networking devices within data center 100 requires that the interconnection technology utilized between the networking devices and their corresponding TOR switch 106 must have low cost and power consumption. In both copper-based electrical interconnect technologies, as well as multi-mode fiber (MMF)-based optical interconnect technologies, this reduction in cost and power is usually made at the expense of interconnect reach—that is, a reduction in cost and power results in a reduction in the maximum possible transmission distance of the communication link.

As a result of the reduced interconnect reach, the networking devices and their corresponding TOR switch 106 must be co-located, meaning that the networking devices, as well any other supporting devices, need to be organized and housed in a modular fashion, on a rack-unit (or multi-rack unit) basis. Logistical considerations of ease of construction and deployment of data center 100 also make this modular approach necessary (e.g., electrical/optical cabling, floor plan, etc. is made much simpler), but the rack-modular design makes planning and efficient upgrading of the data center extremely difficult. As an example, for every modular unit there must be a match in the number of networking devices and TOR switch ports facing towards the networking devices to use all available resources. But because the total number of ports for a given TOR switch is fixed, the number of down-facing ports of the TOR switch restricts the value of the oversubscription ratio at the switch. Because the oversubscription ratio greatly affects network performance, and hence overall performance, it should ideally be chosen for the particular application being run within the data center (which changes over time on a particular rack).

Although this oversubscription effect could be introduced at another point within the data center network (e.g., within switching network 112), implementing it at TOR switches 106 is strongly preferred to reduce cost and for uniform implementation (i.e., all communication is equally affected). In addition, even if all the grouping and interfacing requirements could be resolved for a particular generation of networking devices, switches, and enclosure technologies, the evolution of these technologies will invariably be different. Switches may become available with more ports, but due to the predefined number of networking devices per rack, it can be impossible to match a new switch within the current modular design. The options are then (1) to strand (e.g., not utilize) a number of ports on the switch; (2) to reduce the number of networking devices per rack, which wastes space and power reserved for the rack; or (3) to change the oversubscription ratio, which can degrade performance or overprovision the networking devices with excessive bandwidth.

Identical issues arise for evolution of the networking devices or enclosure technologies. In addition, because the design must be modular, the waste in resources is repeated at every modular unit. Thus, the inflexible nature of the modular design makes leveraging of technological evolution extremely difficult. Finally, the modular design places constraints on the software that controls traffic flow within the data center, making it difficult to change or expand the data center.

Figure 2:
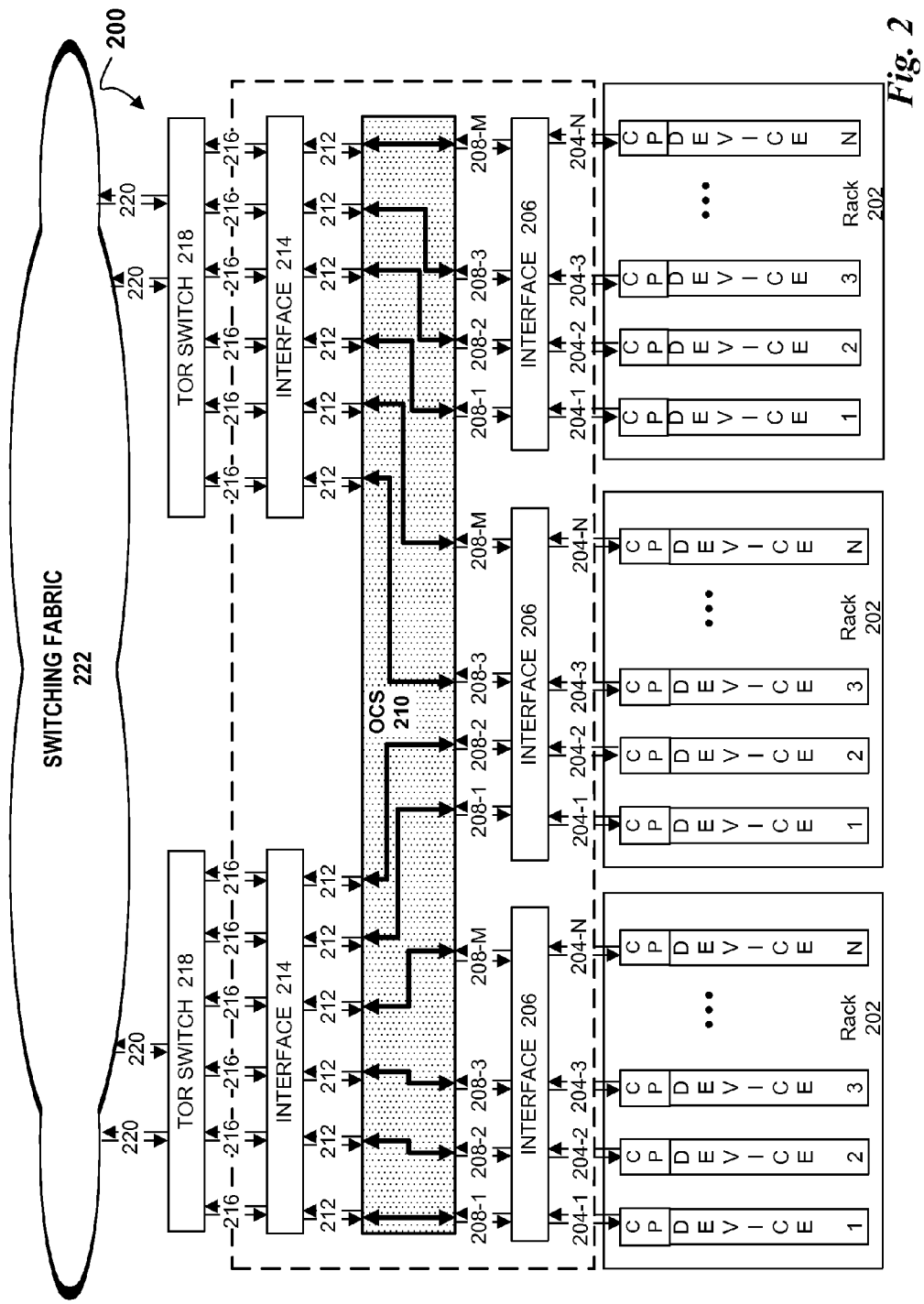
FIG. 2 is a block diagram of another implementation of a data center.

FIG. 2 illustrates another implementation of a data center 200. Data center 200 includes a plurality of racks 202. Within each rack 202 are housed N networking devices, where N can be any number greater than one. Each networking device can be a server, a router, a switch or some other kind of electrical networking equipment, and each networking device is coupled to a corresponding communication port (CP) or multiple CPs. A communication port can be one or more elements, such as electrical or optical transceivers, that are coupled to the networking device and allow the networking device to communicate with other networking devices.

Each networking device in a rack 202 is coupled through its CP to an optical circuit switch (OCS) 210 via a first interface 206. In the illustrated implementation first interfaces 206 are grouped such that each first interface 206 is associated with a specific rack 202, but other groupings are possible in other implementations. First interfaces 206 are coupled to the CP of every networking device in a rack 202 by a number N of communication links 204, and are coupled to OCS 210 by a number M of communication links 208. In one implementation of data center 200 communication links 204 can be can be electrical links such as copper wire, but in other implementations links 204 can be optical links. In an implementation where links 204 are optical, the links can be a pair of unidirectional multimode fiber (MMF) links, a single bidirectional MMF link, a pair of unidirectional single-mode fiber (SMF) links, or a single bidirectional SMF link. In still other implementations, all links 204 need not be of the same type. Similarly, in one implementation communication links 208 can be optical links, for example a pair of unidirectional single-mode fiber (SMF) links or a single bidirectional SMF link. In still other implementations, all links 208 need not be of the same type.

First interfaces 206 can perform operations on signals exchanged between the networking equipment and OCS 210, depending for example on the nature of communication links 204 and 208. Examples of potential operations that can be performed by first interfaces 206 include electro-optic and/or opto-electronic conversion, signal aggregation and de-aggregation, wavelength division multiplexing (WDM), etc. Embodiments of first interface 206 are described below in connection with FIGS. 3-6B. In some implementations where the CP of each networking device is correctly configured, first interfaces 206 can be omitted completely and the CPs can be directly coupled to OCS 210, as shown in FIG. 7.

Optical circuit switch (OCS) 210 is essentially a remotely programmable N-input/N-output optical patch panel that bijectively maps N input light beams to N output ports. OCS 210 can be optically transparent, meaning it can be compatible with progressive generations of wavelength division multiplexing (WDM) technology and require no upgrades if the bandwidths of WDM SMF-based interconnects coupled to OCS 210 are increased. OCS 210 can also be programmable, so that its use facilitates control, planning, and management of the connectivity between the components to which it is attached.

OCS 210 is also coupled to a plurality of TOR switches 218 via second interfaces 214. Second interfaces 214 can perform operations on signals exchanged between TOR switched 218 and OCS 210, depending for example on the nature of communication links 212 and 216. Examples of potential operations that can be performed by first interfaces 214 include electro-optic and/or opto-electronic conversion, signal aggregation and de-aggregation, wavelength division multiplexing (WDM), etc. Embodiments of second interfaces 214 can be similar in function and design to the implementations of first interface 206 described in FIGS. 3-6B.

Second interfaces 214 are coupled to OCS 210 by communication links 212 and are coupled to a TOR switch 218 by communication links 216. In one implementation of data center 200 communication links 212 can be optical links, for example a pair of unidirectional single-mode fiber (SMF) links or a single bidirectional SMF link. In still other implementations, all links 212 need not be of the same type. Similarly, in one implementation communication links 216 can be can be electrical links such as copper wire, but in other implementations links 216 can be optical links. In an implementation where links 216 are optical, the links can be a pair of unidirectional multimode fiber (MMF) links, a single bidirectional MMF link, a pair of unidirectional single-mode fiber (SMF) links, or a single bidirectional SMF link. In still other implementations, all links 216 need not be of the same type.

In addition to being coupled to second interfaces 214, TOR switches 218 are coupled to switching fabric 222 via communication links 220. In one implementation communication links 220 can be can be electrical links such as copper wire, but in other implementations links 220 can be optical links. In an implementation where links 220 are optical, the links can be a pair of unidirectional multimode fiber (MMF) links, a single bidirectional MMF link, a pair of unidirectional single-mode fiber (SMF) links, or a single bidirectional SMF link. In still other implementations, all links 220 need not be of the same type. Switching fabric 222 enables the devices in different racks 202 to communicate with each other, as well as to communicate with other devices within or outside data center 200. In one implementation, interconnect fabric 222 is based on single-mode or multi-mode fiber or multiple strands of single-mode or multi-mode fiber, and can include optical amplifiers, optical wavelength routers, optical or electrical packet routers, optical or electrical packet or circuit switches, fiber patch panels and other optical/electrical networking devices coupled with single-mode or mutli-mode optical fiber.

Conceptually, if the number of ports on the OCS 210 was unlimited, all networking devices (near and far) could be plugged into the OCS via long-reach-capable SMF links, with the network connectivity configured via OCS 210 using software. Use of OCS 210 thus de-couples the logical and physical placement of networking devices—that is, unlike in data center 100 the networking devices no longer need to be co-located with other networking devices or with auxiliary devices such as TOR switches. OCS 210 combined with SMF based links therefore allows for flexible and non-modular data center design.

With the reach and logistical limitations lifted, there is no longer a need to match the oversubscription ratio or the various server, switch, and enclosure technologies utilized. For the desired oversubscription ratio, the TOR switch will have N down-facing ports that connect to the servers. With software, N servers are then simply assigned for this TOR switch from the large pool of servers connected to the OCS. The placement of the TOR switch no longer needs to be at the top of the rack of servers that it connects to, but it can be anywhere within the data center (several meters to hundreds of kilometers away). In addition, all racks can be fitted with host computers to their maximum capacity since physical placement of the hosts is no longer constrained.

Although the initial assumption of unlimited OCS scale is obviously invalid, by having an OCS with scale significantly larger than that provided at the rack-level, the need for modular design is relaxed or nearly eliminated. Put in different terms, the waste in resources caused by the modular design is replicated not at the rack unit, but at the unit defined by the OCS. Thus, the advantage of the proposed approach increases with the scale of the OCS.

Finally, with a new generation of server, switch, or enclosure technology, it is simply deployed and plugged into the OCS. At this point, reconfiguration of the network consists of adjusting the network connections through software. This is in contrast to the data center shown in FIG. 1, where all connectivity changes would need to be manually rewired—a nearly impossible task, considering the tens of thousands of strands of fiber required to connect the networking devices. This difficulty is again in addition to the design constraints introduced by the modular design.

Figure 3:
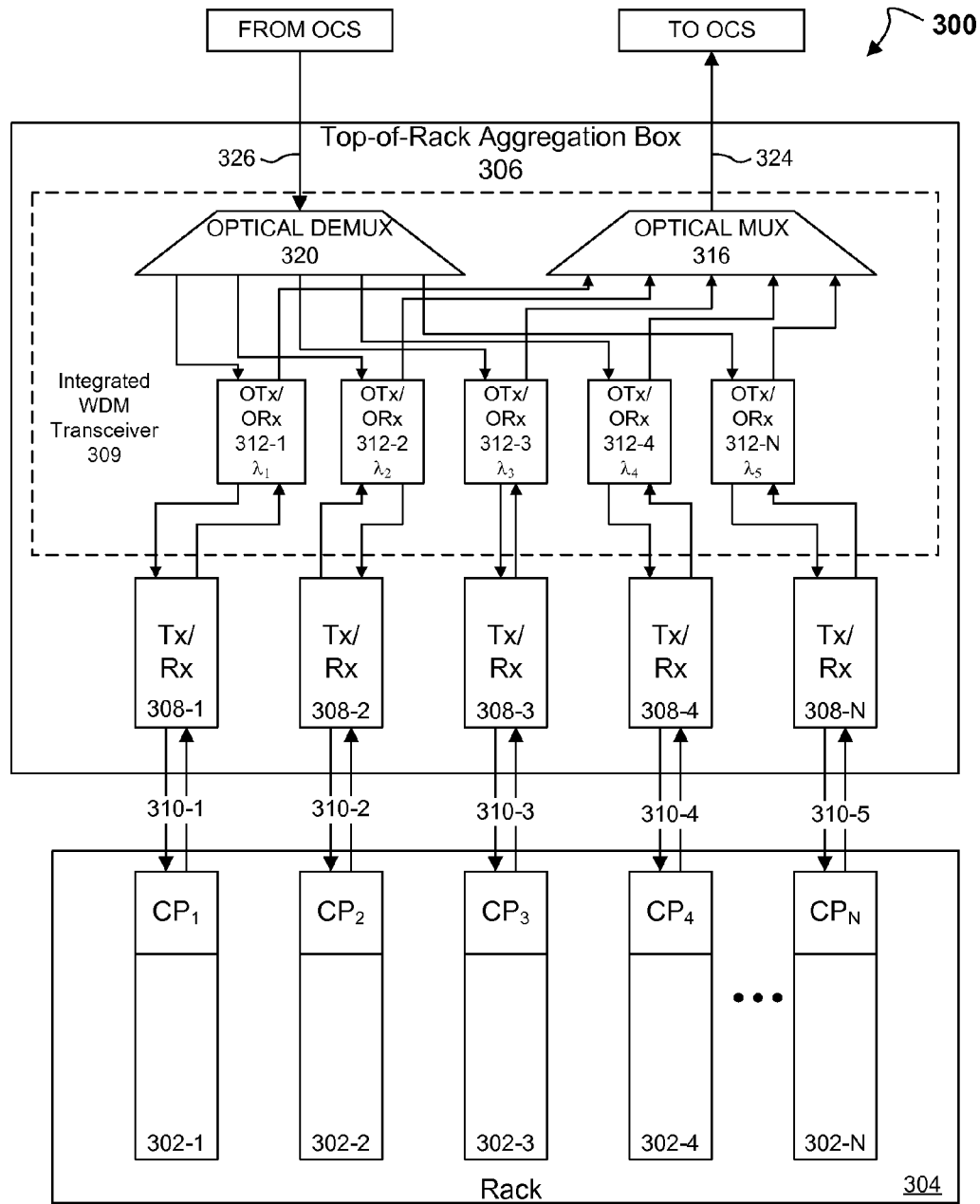
FIG. 3 is a block diagram of an implementation of an interface that can be used in the data center implementations shown in FIGS. 1-2.

FIG. 3 illustrates an implementation of an apparatus 300 that implements first interface 206 and/or second interface 214 in implementations of data center 200. Apparatus 300 includes a plurality of networking devices 302-1 through 302-N housed in a rack 304, where N can be any number greater than one. Each networking device 302 can be a server, a router, a switch or some other kind of electrical networking equipment. Each networking device 302 is coupled to a corresponding communication port (CP): networking device 302-1 is coupled the communication port CP1, networking device 302-2 is coupled communication port CP2, etc. Each device may also have multiple CPs. A communication port can be one or more elements, such as electrical or optical transceivers, that are coupled to the networking device and allow the networking device to communicate with other networking devices.

A top-of-rack (TOR) aggregation box 306 is positioned atop rack 304. Aggregation box 306 includes a plurality of transceivers 308, and an integrated wavelength division multiplexing (WDM) transceiver 309. Each transceiver 308 is communicatively coupled to a corresponding CP by communication link 310: CP1 is coupled to transceiver 308-1 by link 310-1, CP2 is coupled to transceiver 308-2 by link 310-2, etc. In one implementation, communication links 310 can be electrical links, such as copper wire, but in other implementations links 310 can be optical links, for example a pair of unidirectional multimode fiber (MMF) links or a single bidirectional MMF link. In still other implementations, all links 310 need not be of the same type. In implementations where links 310 are electrical, transceivers 308 can be eliminated, leaving an electrical connection from the CPs to transceivers 312 using connections such as copper cables.

In addition to being coupled to a corresponding CP, each transceiver 308 is also coupled to a corresponding optical transceiver 312 within integrated WDM transceiver 309. Each optical transceiver 312 includes an optical receiver (ORx) and an optical transmitter (OTx). In one implementation, each optical transceiver 312 the optical transmitter includes a laser that generates an optical carrier signal at a wavelength λ, different than the carrier wavelength of the other optical transceivers 312; hence, optical transceiver 312-1 transmits at a carrier wavelength $\lambda_1$, optical transceiver 312-2 transmits at a carrier wavelength $\lambda_2$, and so forth. In each optical transmitter, data can then be modulated onto the optical carrier signal to create an optical data signal (see FIG. 8). The optical data signals from all optical transmitters are then routed to the optical multiplexer.

Optical multiplexer 316 and optical demultiplexer 320 are coupled to each of the plurality of transceivers 312. Each receiver is optically coupled to optical demultiplexer 320, while each transmitter has its output coupled to optical multiplexer 316. Optical multiplexer 316 receives optical signals from each optical transceiver 312, combines these signals into a WDM signal, and transmits the WDM signal through optical fiber 324. Similarly, optical demultiplexer 320 receives a WDM signal through an optical fiber 326, separates the individual signals from the WDM signal, and transmits the individual signals to the receivers in transceivers 312. In one implementation, both fibers 324 and 326 are single-mode optical fibers.

In operation of apparatus 300, signals originating from each networking device 302 are transmitted through the corresponding CP to transceivers 308. Transceivers 308 receive signals, perform any necessary opto-electronic conversion, and transmit electrical signals to optical transceivers 312. Optical transceivers 312 modulate data received from transceivers 308 onto optical carrier signals to create optical data signals. These optical data signals are then sent to optical multiplexer 316, where they are combined into an optical WDM signal that is then transmitted over single mode optical fiber 324. In the reverse direction, an optical WDM signal arrives at optical demultiplexer 320 via single-mode optical fiber 326. Demultiplexer 320 splits the WDM signal into its individual optical component signals, and the individual optical component signals are sent via single-mode optical fibers to transceivers 312. Transceivers 312 then perform opto-electric conversion and send the electrical signals to transceivers 308, which then forward signals to the CPs and networking devices 302.

Figure 4:
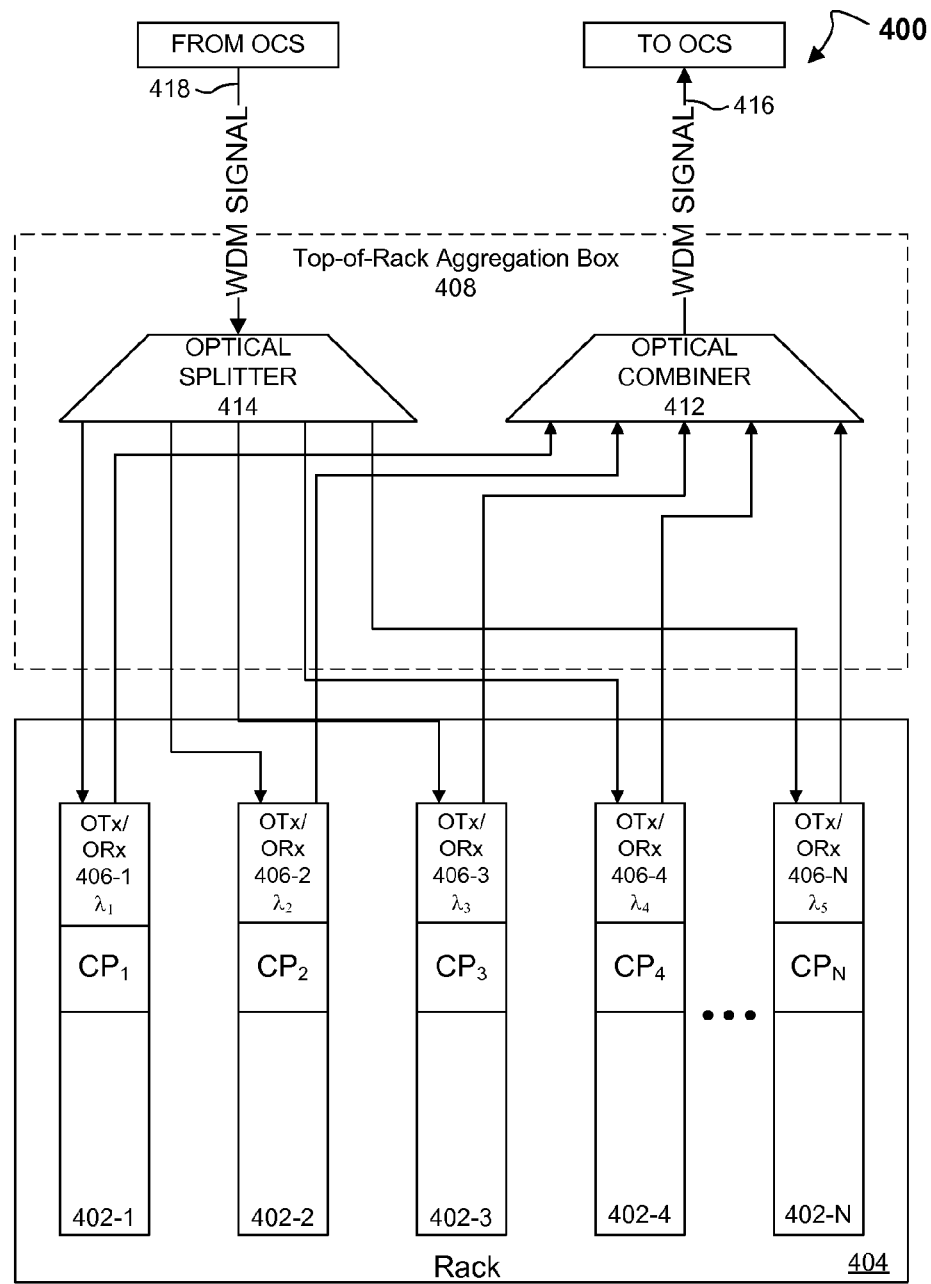
FIG. 4 is a block diagram of another implementation of an interface that can be used in the data center implementations shown in FIGS. 1-2.

FIG. 4 illustrates an alternative implementation of an apparatus 400 that can serve as first interface 206 and/or second interface 214 in implementations of data center 200. Apparatus 400 includes a plurality of networking devices 402-1 through 402-N housed in a rack 404, where N can be any number greater than one. Each networking device 402 can be a server, a router, a switch or some other electrical networking device. Each networking device 402 is coupled to a corresponding communication port (CP) or CPs: networking device 402-1 is coupled to communication port CP1, networking device 402-2 is coupled to communication port CP2, and so on. Each CP is also communicatively coupled to a corresponding optical transceiver 406: CP1 is coupled to optical transceiver 406-1, CP2 is coupled to optical transceiver 406-2, etc. In the illustrated implementation each transceiver 406 is integrated with its corresponding CP and networking device 402, but in other implementations the transceiver, the CP and the networking device can be separate elements.

Each optical transceiver 406 includes an optical receiver (ORx) and can an optical transmitter (OTx). Each transmitter includes a laser that generates an optical carrier signal at a wavelength λ, different than the carrier wavelength of the other transceivers 406: transceiver 406-1 transmits at a carrier wavelength $\lambda_1$, transceiver 406-2 transmits at a different carrier wavelength $\lambda_2$, and so forth. In each transmitter, data can be modulated onto the optical carrier signal to create an optical data signal (see FIG. 8). The optical data signals from all transmitters are then routed to the optical combiner 412.

As the bandwidth to and from individual CPs continues to increase, in some implementations each individual CP can use a multi-wavelength WDM signal (e.g., a waveband signal). Combining or multiplexing signals from multiple CPs, where the signal from each CP consists of multiple wavelengths, can be accomplished with an optical band-mux which interleaves wavebands to combine the various WDM signals onto a single fiber. An optical coupler can be used in place of the band-mux. On the receive side, either a band-demux can be used or couplers can be substituted for the band demux, with wavelength filters at the receivers to select out the applicable wavebands.

An aggregation box 408 is positioned atop rack 404 and houses an optical combiner 412 and an optical splitter 414, both of which are passive optical elements that require little or no maintenance and no power, cooling, etc. In certain implementations, optical combiner 412 can be optical coupler arrays, Littrow gratings, diffraction grating devices such as Array Waveguide Gratings (AWGs), or Echelle grating, wavelength add-drop multiplexers and/or other kinds of optical multiplexing devices to combine optical signals with different carrier wavelengths into an optical WDM signal. Similarly, in certain implementations, optical splitter 414 can include splitter arrays with Fabry-Perot filters (or other types of wavelength dependent filters), optical circulators with wavelength dependent filters, diffraction grating devices such as Fiber Bragg Gratings, Echelle gratings, Littrow gratings, AWGs, add-drop multiplexers, cascaded Mach-Zehnder interferometers, and other kinds of demultiplexing devices. In other implementations the combiner and separator could be implemented with a pair of optical couplers; use of the couplers would necessitate a wavelength filter in front of or integrated into the receiver at each port to select the correct wavelength signal, but such filters may not be necessary with some demultiplexer solutions.

Optical combiner 412 can be coupled to the optical transmitters of each transceiver 406 by a single-mode optical fiber, so that optical combiner 412 receives optical signals from each transceiver 406, combines these signals into a WDM signal, and then transmits the WDM signal through single-mode optical fiber 416. Similarly, optical splitter 414 is coupled to the receiver inputs of each transceiver 406 by a single-mode optical fiber, so that optical splitter 414 receives a WDM signal through single-mode optical fiber 418, separates the individual signals from the WDM signal, and transmits the individual signals to the receivers in transceivers 406.

Apparatus 400 functions similarly to apparatus 300, except that various components such as transceivers 308 are eliminated, and components are grouped differently to improve their performance and reliability. A significant advantage of this approach is increased fault tolerance, as no electrical power is required at the top-of-rack aggregation box 408 and the failure rate of a passive optical component is extremely low. The number of components is also significantly reduced, which simplifies the system and increases fault tolerance. Fate sharing between the N communication ports is also eliminated. Finally, if single-mode-fiber (SMF)-based interconnections are pushed all the way down to the communication ports, all the benefits of WDM SMF links are obtained for this distance, meaning that the fiber infrastructure can be kept constant, scalability in bandwidth and reach are achieved, and fiber count and patch panel size are reduced for the port to top-of-rack box link.

Figure 5:
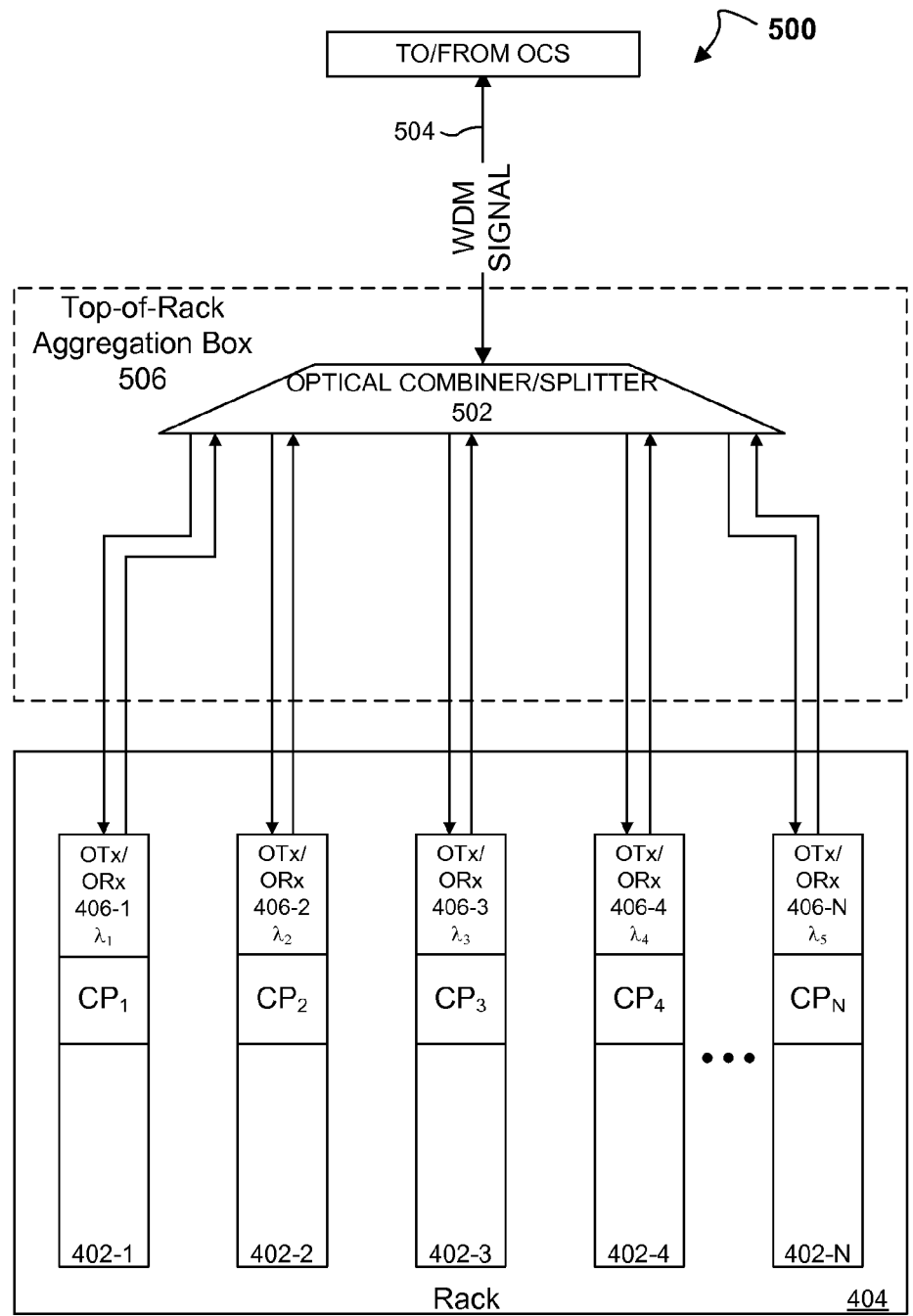
FIG. 5 is a block diagram of another implementation of an interface that can be used in the data center implementations shown in FIGS. 1-2.

FIG. 5 illustrates another implementation of an apparatus 500 that implements first interface 206 and/or second interface 214 in implementations of data center 200. Apparatus 500 is in most respects similar to apparatus 400. The primary difference is that apparatus 500 replaces separate optical combiner 412 and optical splitter 414 with a single optical combiner/splitter 502. Optical combiner/splitter 502 combines the outgoing (transmission) optical WDM signals and splits the incoming (reception) optical WDM signals. Combining the optical splitter with the optical combiner means that single-mode optical fiber 504 is bidirectional, such that single-mode fiber 504 can carry optical WDM signals in two directions simultaneously. As in apparatus 400, in apparatus 500 top-of-rack aggregation box 506 includes only passive optical elements that require little or no maintenance and no power, cooling, etc.

Apparatus 500 operates similarly to apparatus 400, but in apparatus 500, optical combiner/splitter 502 has two functions. First, combiner/splitter 502 receives non-multiplexed optical data signals with different carrier wavelengths from transceivers 406 and, using wavelength division multiplexing (WDM), multiplexes or combines the optical data signals into an optically multiplexed (muxed) signal and transmits that optically muxed signal into single-mode fiber 504. Second, combiner/splitter 502 receives an optically muxed signal through single-mode fiber 504, de-multiplexes or splits the optically muxed signal into its component data signals with different optical carrier wavelengths, and routes the individual demultiplexed signals to the correct receiver. This integrated optical combiner/splitter 502 has a single connection to one single mode fiber 504, and allows bi-directional WDM operation. In the particular case that in each transceiver 406 the optical transmitters have the same wavelength as the receivers, an optical directional combiner, such as an optical circulator, can be used to combine the transmitting and receiving signals on a single fiber or waveguide, which connects to the mux/demux 502 (see, e.g., FIGS. 6A-6B).

Figure 6A:
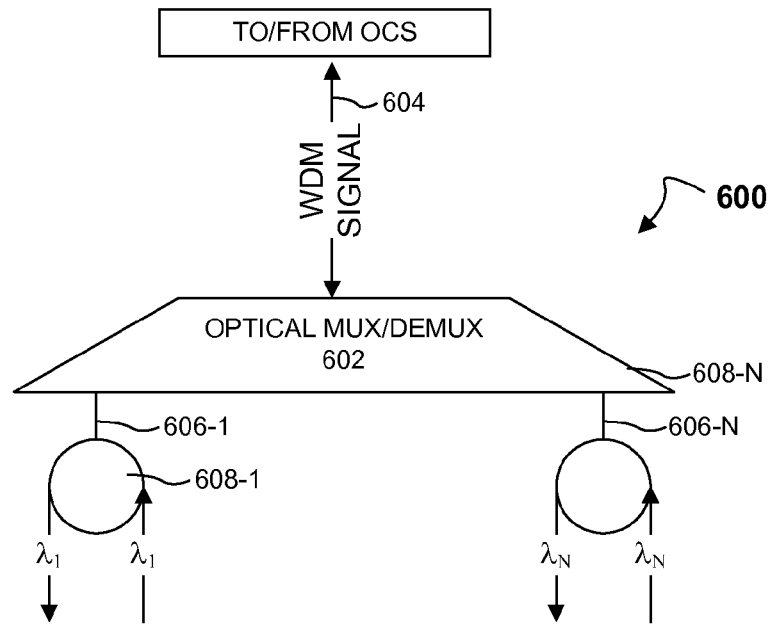
FIGS. 6A-6B are block diagrams of implementations of integrated optical combiner/splitters that can be used with the implementation of an aggregation and de-aggregation apparatus shown in FIG. 5.
Figure 6B:
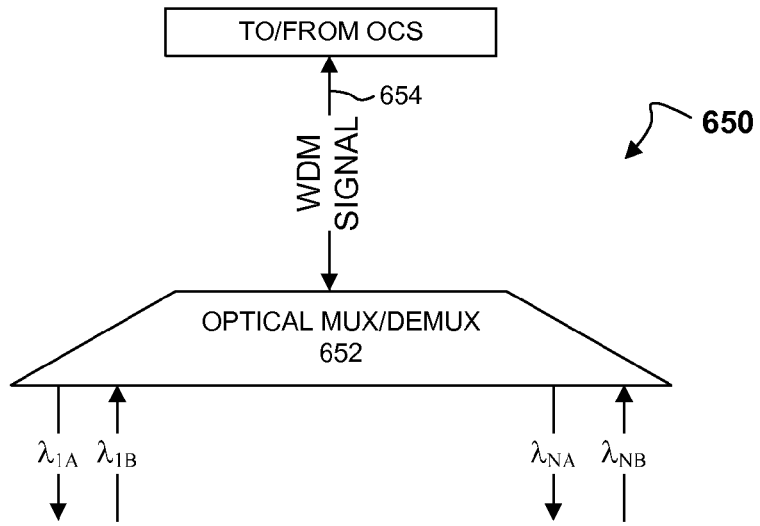
Figure 7:
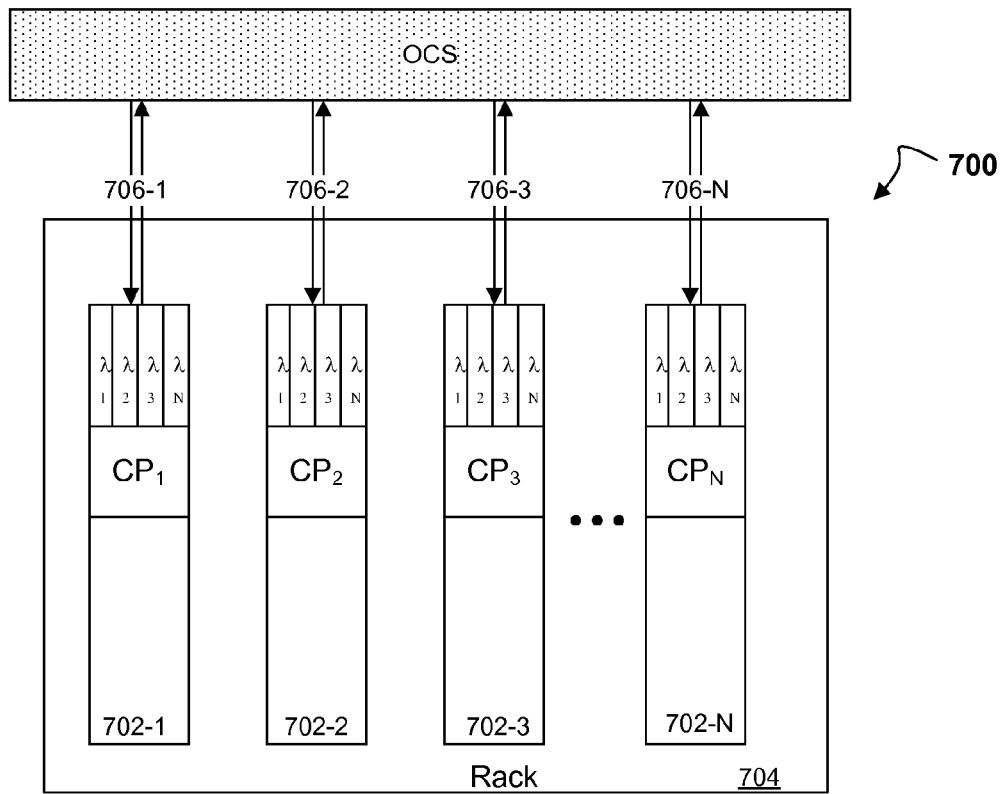
FIG. 7 is a block diagram of another implementation of an interface that can be used in the data center implementations shown in FIGS. 1-2.

FIGS. 6A-6B illustrate implementations of integrated optical combiner/splitters that can be used in apparatus 500. FIG. 6A illustrates an optical combiner/splitter 602 that receives and transmits bi-directional WDM signals via a single-mode fiber 604. Combiner/splitter 602 includes a plurality of input/output ports 606-1 through 606-N, and an optical circulator 608 is coupled to each input/output port 606. The input of each optical circulator is coupled to the transmitter of a corresponding transceiver, while the output of each optical circulator is coupled to the receiver of the corresponding transceiver. In an implementation where the transceiver transmits and receives at substantially the same wavelength, optical circulator 608 can separate the transmitted optical data signals from the received optical signals; in other words, optical circulator 608 sorts out the directionality of optical data signals having substantially the same carrier wavelength.

FIG. 6B illustrates an optical combiner/splitter 652 that receives and transmits bi-directional WDM signals via a single-mode fiber 654. Combiner/splitter 652 includes a plurality of pairs of input and output ports where each input port in the pair receives an optical data signal with a first carries wavelength and the corresponding output port outputs a signal at a different carrier wavelength. Combiner/splitter 652 can be used in an implementation of apparatus 500 in which each receiver receives at a different wavelength than its paired transmitter.

FIG. 7 illustrates another implementation of an apparatus 700 that implements first interface 206 and/or second interface 214 in implementations of data center 200. Apparatus 700 includes a plurality of networking devices 702-1 through 702-N housed in a rack 704, where N can be any number greater than one. Each networking device 702 can be a server, a router, a switch or some other electrical networking device, and each networking device 702 is coupled to a corresponding communication port (CP) or CPs. In the illustrated implementation, each CP is communicatively coupled to, and integrated with, a wavelength-division multiplexing (WDM) transceiver that, among other things, includes transmitters that transmit on a number of different carrier wavelengths λ, and receivers that receive on a number of different carrier wavelengths. In other implementations, however, each CP could be coupled to a single-wavelength transceiver, such that no WDM occurs—that is, the signals from the CPs can be single wavelength signals or multi-wavelength signals, depending on the transmitter-receiver technology employed.

Each transceiver, whether WDM or not, can be coupled directly to the optical control switch via communication links 706, which in one implementation can be one or more single-mode optical fibers, depending on whether unidirectional or bidirectional communication is desired. In this case no aggregation occurs, and the networking devices are coupled to the OCS via SMF links. Effectively, then, this approach eliminates the need for a separate interface between the networking devices and the OCS. The advantage of this approach is there is no modularity reintroduced, as is the case with an active or passive mux/demux box (see FIGS. 3 and 4-5, respectively). A drawback of this approach is that the OCS must support a large number of communication ports (i.e., the ports of the servers as well as the switch must all be connected to the OCS).

As the bandwidth to and from individual CPs continues to increase, in some implementations each individual CP can use a multi-wavelength WDM signal (e.g., a waveband signal). Combining or multiplexing signals from multiple CPs, where the signal from each CP consists of multiple wavelengths, can be accomplished with an optical band-mux which interleaves wavebands to combine the various WDM signals onto a single fiber. An optical coupler can be used in place of the band-mux. On the receive side, either a band-demux can be used or couplers can be substituted for the band demux, with wavelength filters at the receivers to select out the applicable wavebands.

FIG. 8 illustrates an implementation of an optical transmitter 800, which includes a laser 802. Coupling optics 806 are positioned at the output of laser 802 to form a focused carrier signal 807 and can include refractive, reflective and/or diffractive elements. An optical modulator 808 is positioned in the optical path of carrier signal 807, and optics 810 are positioned in the optical path of the output of optical modulator 808 to launch the output of the optical modulator into a waveguide 812. Other implementations of a transmitter can include other elements that are not shown, such as beamsplitter/combiner, wavelength locker, laser or modulator driver, monitor photodetector, control circuits and so on.

Laser 802 can be any kind of laser that outputs an optical beam at the desired carrier wavelength and within required power and efficiency constraints. Embodiments of laser 802 can output wavelength ranging from about 1200 nm to about 1800 nm, but in other implementations wavelengths outside this range are possible. In implementations of transmitter 800 that will be used together with fairly dense wavelength spacing (coarse WDM is defined as about 20 nm wavelength spacing; wavelength spacing less than this, for example 1 nm or less in one implementation, can be considered "denser" WDM), a laser that outputs with narrow spectral width and within a narrow wavelength band is desirable when high spectral efficiency is needed. In one implementation, laser 802 can be a Fabry-Perot laser, but in other implementations it can be another type of laser, such as a continuous wave (CW) laser, a DBR laser, DFB laser, a short-cavity DFB laser, a tunable laser, a multi-line laser coupled with a filtering element, or a quantum dot (QD) laser.

In some implementations, the output wavelength of laser 802 can be temperature dependent, which can lead to wavelength drift during operation. In implementations where the output wavelength of laser 802 needs to be controlled, a temperature control unit 804 can be coupled to the laser to stabilize the output wavelength. Temperature control unit 804 can be an active element, such as a thermo-electric cooler (TEC), or can be a passive element such as a heat sink or heater to transfer heat from or to the laser. A temperature control unit 804 could also be shared among some or all devices inside one implementation (i.e., other lasers, photodetectors, modulators, circuits, multiplexers, demultiplexers, etc.).

Optical modulator 808 is positioned in the path of the carrier signal 807 and is also coupled to a data source 803. In one implementation data source 803 can be a communication port of a server, but in other implementations data source 803 can be the communication port of another kind of device, such as an electrical router or switch. In other implementations data source 803 can include interface devices connected to a communication port.

Optical modulator 808 performs an electro-optic conversion of the signal received from data source 803 by modulating the data onto the carrier signal 807 from laser 802. The output of optical modulator 808 is thus an optical data signal 809. The optical modulator 808 can be implemented in various configurations, such as an electro-optic Mach-Zehnder modulator (MZM) or an electro-absorption modulator (EAM). In the illustrated implementation optical modulator 808 is an external modulator, but in other implementations, laser 802 can be modulated directly by the data 803 in the form of a driving current feeding into the laser, and produces a modulated optical data signal at a respective WDM channel.

Optics 810 are positioned in the optical path of optical data signal 809 to launch the optical data signal or signals from multiple input data channels, into a waveguide 812, which in one implementation can be a single-mode optical fiber. The particular nature of optics 810 will depend on such factors as the size of the optical data signal 809 and the size of the core of waveguide 812. For example, if the optical data signal 809 spreads out at a particular angle, optics 810 must be large enough to capture the signal, as well as focus the signal into the core of waveguide 812. In certain implementations, optics 810 can include refractive, reflective and/or diffractive optics.

FIG. 9 illustrates an implementation of an optical receiver 900. Receiver 900 includes an input waveguide 902 optically coupled to optics 906. Optics 906 is in turn optically coupled to photodetector 910, and photodetector 910 is electrically connected to signal processing circuitry 914. In one implementation waveguide 902 can be a single-mode optical fiber, but in other implementations other types of waveguides can be used.

Optics 906 are positioned in the optical path of received optical data signal 904 and serve to condition optical signal 904, for example by focusing it, and to direct it toward photodetector 910. The particular nature of optics 906 will depend on such factors as the spread angle of optical data signal 904 when it leaves the end of waveguide 902 and the size of photodetector 910. In some implementations, optics 906 can include one or more of refractive, reflective and diffractive optics. In some implementations optics 906 can be unnecessary, such that received optical data signal 904 can go directly from waveguide 902 to photodetector 910.

Photodetector 910 receives optical data signal 908, performs an optoelectronic conversion, and outputs an electrical data signal 912. Photodetector 910 can be any kind of photodetector that has sufficient sensitivity at the carrier wavelength of received optical data signal 908. Here, sufficient sensitivity implies a photodetector sensitivity high enough such that the resulting electrical data signal 912 is large enough and can be detected cleanly, with high integrity and little or no errors. In one implementation photodetector 910 can be a p-n or p-i-n photodiode, but in other implementations other types of photodiodes, such as avalanche photodiodes (APD), Schottky photodiodes, and phototransistors, can be used.

Signal processing circuitry 914 receives electrical data signal 912, extracts the data from the data signal, and transmits that data to a communication port of a device such as a server, a switch or a router. The data can also be transmitted to interface devices, which in turn connect to a communication port. Signal processing circuitry 914 can also provide additional signal conditioning functions, such as signal amplification, filtering, etc.

Although FIGS. 8-9 illustrate the transmitter and receiver as separate entities, in other implementations the various wavelength transmitters and receivers and their component parts can be grouped/integrated into a single system—that is, each transmitter and receiver pair corresponding to a particular communication port can be integrated into a transceiver or arrays of transmitters and/or receivers can be integrated into a multi wavelength/channel transceiver, for example a WDM transceiver. For the transmitter side, all the lasers or a sub-set of the lasers can be integrated into a single semiconductor substrate. Likewise, if modulators were used, the lasers and modulators could be integrated, and additionally, the various laser-modulator pairs could be integrated into arrays. For the receiver side, all the photodetectors or a sub-set of the photodetectors can be integrated into a single semiconductor substrate. Finally, the lasers, modulators, photodetectors, etc., could all be integrated, or sub-sets integrated, in the form of a monolithic or hybrid photonic integrated circuit (PIC). In addition, the above photonic devices can be integrated with the electronic circuits, in the form of a monolithic or hybrid optoelectronic integrated circuit (OEIC).

The above description of illustrated implementations of the invention, including what is described in the abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

The invention claimed is:

1. An apparatus comprising:
   a plurality of racks, wherein each rack houses a plurality of networking devices, each networking device including one or more communication ports;
   a plurality of top-of-rack (TOR) switches;
   an optical circuit switch coupling each of the plurality of communication ports in one or more of the plurality of racks to the plurality of TOR switches.

2. The apparatus of claim 1, further comprising a plurality of first interfaces, each first interface coupled to each communication port in one of the plurality of racks and optically coupled to the optical circuit switch.

3. The apparatus of claim 2 wherein at least one first interface is electrically coupled to each communication port.

4. The apparatus of claim 2 wherein each first interface is coupled to the optical circuit switch by one or more optical fibers.

5. The apparatus of claim 4 wherein each optical fiber carries an optical wavelength division multiplexing (WDM) signal.

6. The apparatus of claim 4 wherein each optical fiber carries an optical waveband signal comprising a plurality of multiplexed optical WDM signals.

7. The apparatus of claim 1, further comprising a plurality of second interfaces, wherein each second interface is optically coupled to the optical circuit switch and to a corresponding TOR switch.

8. The apparatus of claim 7 wherein each second interface is optically or electrically coupled to the corresponding TOR switch.

9. The apparatus of claim 7 wherein the second interface is coupled to the optical circuit switch by one or more optical fibers.

10. The apparatus of claim 9 wherein each optical fiber carries an optical wavelength division multiplexing (WDM) signal.

11. The apparatus of claim 1 wherein the connection capacity of the optical circuit switch is substantially larger than the connection capacity of each individual TOR switch.

12. A data center comprising:
a plurality of racks, wherein each rack houses a plurality of networking devices, each networking device including one or more communication ports;
a plurality of top-of-rack (TOR) switches;
an optical circuit switch coupling each of the plurality of communication ports in one or more of the plurality of racks to the plurality of TOR switches; and
an optical fiber interconnect fabric comprising routing and switching elements coupled by optical fiber, wherein the optical fiber interconnect fabric is optically coupled to each TOR switch by at least one optical fiber.

13. The data center of claim 12, further comprising a plurality of first interfaces, each first interface coupled to each communication port in one of the plurality of racks and optically coupled to the optical circuit switch.

14. The data center of claim 13 wherein at least one first interface is electrically coupled to each communication port.

15. The data center of claim 13 wherein each first interface is coupled to the optical circuit switch by one or more optical fibers.

16. The data center of claim 15 wherein each optical fiber carries an optical wavelength division multiplexing (WDM) signal.

17. The apparatus of claim 15 wherein each optical fiber carries an optical waveband signal comprising a plurality of multiplexed optical WDM signals.

18. The data center of claim 12, further comprising a plurality of second interfaces, wherein each second interface is optically coupled to the optical circuit switch and to a corresponding TOR switch.

19. The data center of claim 18 wherein each second interface is optically or electrically coupled to the corresponding TOR switch.

20. The data center of claim 18 wherein the second interface is coupled to the optical circuit switch by one or more optical fibers.

21. The data center of claim 20 wherein each optical fiber carries an optical wavelength division multiplexing (WDM) signal.

22. The data center of claim 12 wherein the connection capacity of the optical circuit switch is substantially larger than the connection capacity of each individual TOR switch.

23. A process comprising:
exchanging signals between each of a plurality of networking devices arranged in at least one rack and an optical circuit switch;
using the optical circuit switch to route signals between the plurality of networking devices and a plurality of top-of-rack (TOR) switches;
wherein the optical circuit switch distributes signals from the networking devices to the TOR switches and from the TOR switches to the networking devices.

24. The process of claim 23 wherein the optical circuit switch is programmable, such that the distribution of signals between the networking devices and the TOR switches can be changed via software.

25. The process of claim 23 wherein the signals exchanged between the networking devices and the optical circuit switch are optical signals.

26. The process of claim 23, further comprising performing electro-optic and opto-electronic conversion between the networking devices and the optical circuit switch.

27. The process of claim 23, further comprising aggregating signals from the networking devices into wavelength division multiplexing (WDM) and transmitting the WDM signals to the optical circuit switch.

28. The process of claim 27, further comprising de-aggregating WDM signals from the optical circuit switch and transmitting each de-aggregated signal to its corresponding networking device.

29. The process of claim 23, further comprising aggregating signals from the network devices into optical waveband signals comprising a plurality of multiplexed optical WDM signals and transmitting each waveband signal to its corresponding network device.

30. The process of claim 23 wherein the connection capacity of the optical circuit switch is substantially larger than the connection capacity of any individual TOR switch.

* * * * *